United States Patent
Belanger et al.

[11] Patent Number: 5,755,043
[45] Date of Patent: May 26, 1998

[54] CONTOUR DRYER

[75] Inventors: Michael J. Belanger, Walled Lake; Robert J. Wentworth, Farmington Hills; Barry S. Turner, Livonia, all of Mich.

[73] Assignee: Belanger, Inc., Northville, Mich.

[21] Appl. No.: 332,378

[22] Filed: Oct. 31, 1994

[51] Int. Cl.⁶ ........................................ F26B 9/00
[52] U.S. Cl. .................. 34/666; 15/312.1; 15/316.1
[58] Field of Search .............. 34/666, 202; 15/312.1, 15/216.2, 405

[56] References Cited

U.S. PATENT DOCUMENTS

| | | | |
|---|---|---|---|
| 3,224,108 | 12/1965 | Flaming | 34/87 |
| 3,292,192 | 12/1966 | Maxwell | 15/21 |
| 3,510,899 | 5/1970 | Vollenweider et al. | 15/21 |
| 3,593,358 | 7/1971 | Hoffmann | 15/21 |
| 3,662,418 | 5/1972 | Kamiya | 15/21 E |
| 3,688,329 | 9/1972 | Capra | 15/21 E |
| 3,793,663 | 2/1974 | Lieffring | 15/21 D |
| 3,798,696 | 3/1974 | Cirino | 15/21 E |
| 3,822,429 | 7/1974 | Thompson | 15/21 E |
| 3,823,356 | 7/1974 | Paavola et al. | 318/39 |
| 3,867,735 | 2/1975 | Takeuchi | 15/21 D |
| 3,991,433 | 11/1976 | Cirino | 15/312 R |
| 4,194,923 | 3/1980 | Johnson | 134/6 |
| 4,338,698 | 7/1982 | Beer et al. | 15/230.16 |
| 4,495,667 | 1/1985 | Roncaglione et al. | 15/53 A |
| 4,587,688 | 5/1986 | Gougoulas | |
| 4,651,442 | 3/1987 | McIntyre | |
| 4,689,749 | 8/1987 | Glogowski | 364/468 |
| 4,691,401 | 9/1987 | Machin | 15/53 A |
| 4,754,515 | 7/1988 | Ennis et al. | 15/53 AB |
| 4,817,301 | 4/1989 | Belanger et al. | 34/243 C |
| 4,884,946 | 12/1989 | Belanger et al. | |
| 4,887,688 | 12/1989 | Horii et al. | 180/229 |
| 4,931,244 | 6/1990 | Belanger et al. | |
| 4,934,018 | 6/1990 | Fortier et al. | |
| 4,949,423 | 8/1990 | Larson et al. | 15/316 R |
| 5,325,559 | 7/1994 | Belanger et al. | |

Primary Examiner—Henry A. Bennett
Assistant Examiner—Dinnatia Doster
Attorney, Agent, or Firm—Young & Basile, P.C.

[57] ABSTRACT

A dryer is provided for automatically drying the upper contour surface of a vehicle. The dryer includes a frame, a nozzle for directing a stream of air against the vehicle, and an arm pivotally connecting the nozzle to the frame. A drive mechanism raises and lowers the arm to enable the nozzle to follow the contour of the vehicle. The drive mechanism includes a follower affixed to the arm, a rotary drive member cooperating with the follower and a drive motor operably connected to the drive member. The nozzle and arm are lowered by the force of gravity which urges a follower into engagement with the drive member. The follower is capable of being lifted free of the drive member to enable the nozzle to rise up in the event of contact with the vehicle thereby minimizing damage thereto.

20 Claims, 4 Drawing Sheets

United States Patent [19]
CONTOUR DRYER

TECHNICAL FIELD

The present invention relates to devices for blowing a stream of air at the surface of a vehicle, and particularly to dryers of the type used in vehicle washers which dry in the upper surfaces of a vehicle while automatically following the contour thereof without contact.

BACKGROUND OF THE INVENTION

Dryers are frequently used in auto vehicle washes for blow drying the vehicle following the washing process. Dryers come in a wide variety of designs. Although it is relatively easy to dry sides of the vehicle due to their generally straight configuration and fixed orientation relative to the path of the vehicle, it is much more difficult to dry the upper surfaces of the vehicle due to the significantly varying contour of the vehicle. A fixed overhead nozzle is designed to accommodate the tallest vehicle to pass through the wash would have little or no drying affect on the vehicle front, hood, deck lid and rear surfaces.

In order to accommodate the varying height and contour of vehicles on the market, a variety of approaches have been utilized to vary the height of the overhead center dryer nozzle. Some simple systems provide the nozzle with large rubber rollers to enable the nozzle to roll across the surface of the vehicle. Some systems allow the nozzle to ride inches off the surface of the vehicle utilizing the reaction force of the air striking the vehicle to automatically raise and lower the nozzle. A problem with these passive systems is that contact with the vehicle frequently occurs resulting in marks or scratches in the vehicle paint. In order to eliminate contact to the nozzle and the vehicle, many systems utilize optical sensors to detect the location of the vehicle and a drive mechanism to automatically raise and lower the nozzle to maintain the appropriate nozzle/vehicle spacing. Representative patents illustrating such conventional contour dryers are U.S. Pat. Nos. 3,991,433 (Cirino), 4,887,688 (Gougoulas), 4,949,423 (Larsen et al.) and 4,817,301 (Belanger et al.).

In typical automatic contour drying, in response to the optical sensors which detect the presence of the vehicle, a nozzle drive mechanism raises and lowers the nozzle using a hydraulic or pneumatic cylinder. In spite of the best of intentions, invariably, from time to time as a result of malfunction or driver error, a vehicle will strike a blower nozzle. Rigid mechanical drives which precisely control nozzle position result in damage to the vehicle and/or dryer assembly. Efforts to allow the nozzle to yield in response to impact by a vehicle such as by use of a pneumatic cylinder to position the nozzle has an effect of minimizing the damage from impact, however, the occurrence of nozzle-vehicle contact increases due to the lack of positive control over nozzle orientation and if flexibility of the nozzle support structure.

SUMMARY OF INVENTION

It is, an object of the present invention to provide a contour dryer for use with automotive vehicles which precisely position a nozzle relative to the vehicle surface while enabling the nozzle to be freely lifted up in response to inadvertent vehicle/nozzle contact.

It is another object of the present invention provide a highly reliable and maintenance free nozzle drive mechanism which will not vary nozzle position as a function of wear or variations in environmental factors.

Accordingly, the dryer of the present invention is provided for automatically following the contour of the surface of the vehicle to be dried. The dryer has a frame positionable relative to a longitudinal path of the vehicle to be dried. A nozzle is provided for directing a stream of air against the upper surfaces of the vehicle. An arm having a first and second end pivotally connects the nozzle to the frame. One end of the arm is pivotally attached to the frame and the opposite end is connected to the nozzle to facilitate up and down movement of the nozzle relative to the vehicle. A drive mechanism raises and lowers the arm and associated nozzle to enable the nozzle to follow the contour of the vehicle. The drive mechanism includes a follower fixed to the arm, drive member cooperating with follower and a drive motor operably connected to the drive member to enable the arm and nozzle to be raised to the desired height automatically. The nozzle and arm are lowered by the force of gravity which urges the follower to engagement with the drive member. The nozzle and arm assembly are capable of being freely lifted off of the drive member to enable the nozzle to freely rise up in the event of an inadvertent contact between the nozzle and the vehicle thereby minimizing accidental damage, both to the dryer and the vehicle.

BEST MODE FOR CARRYING OUT THE INVENTION

Figure 1:
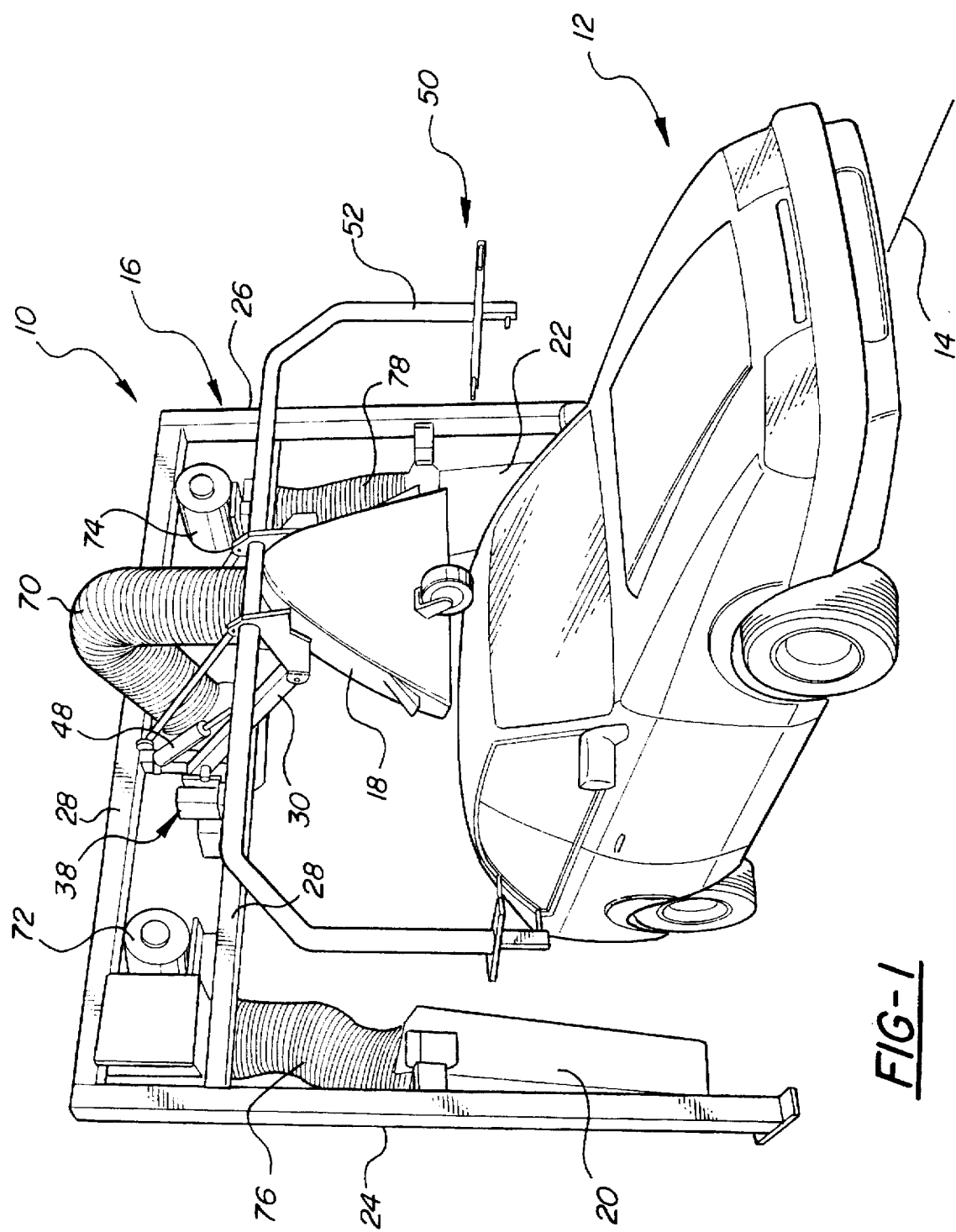
FIG. 1 is a perspective view of the dryer of the present invention in use.

FIG. 1 illustrates a dryer assembly 10 in operation drying the upper surface of vehicle 12. The vehicle is traveling along a longitudinal axis 14 as it passes through a conventional car wash. The dryer assembly 10 includes a frame 16 which in the embodiment illustrated is an inverted U-shaped arch extending over the longitudinal path of the vehicle 14. Frame 16 supports a center nozzle 18 for drying the upper contour surfaces of the vehicle and a right and left pair of side nozzles 20 and 22, respectively for drying the right and left sides of the vehicle. The right and left side nozzles are affixed to the right and left frame upright members 24 and 26 illustrated in FIG. 1. Horizontally extending between the upper ends of right and left frame upright members 24 and 26 are a pair of horizontal frame members 28. Center nozzle 18 is pivotally attached to the horizontal frame members by arm 30. Arm 30 is provided with a first and second end which can be seen in better detail with references to FIGS. 2-4. Arm first end 32 is pivotally connected to horizontal frame 28. Arm second end 34 is affixed to center nozzle 18.

In the preferred embodiment illustrated, the second end 34 of arm 30 is pivotally connected to center nozzle 18. A fixed connection, however, would function provided the arm 30 had sufficient length to prevent an excess of changes as nozzle orientation. Elongated link 36 also is pivotally connected frame 28 and nozzle 18. Link 36 is spaced vertically relative to arm 30 in order to form a four-bar linkage consisting of frame 28, arm 30, nozzle 18 and link 36. In the preferred embodiment illustrated, link 36 is substantially parallel to arm 30 at all nozzle orientations as a result of the parallelogram linkage design. It should be appreciated, however, that a non-parallelogram linkage can be utilized, however nozzle inclination will vary as a function of height.

Figure 2:
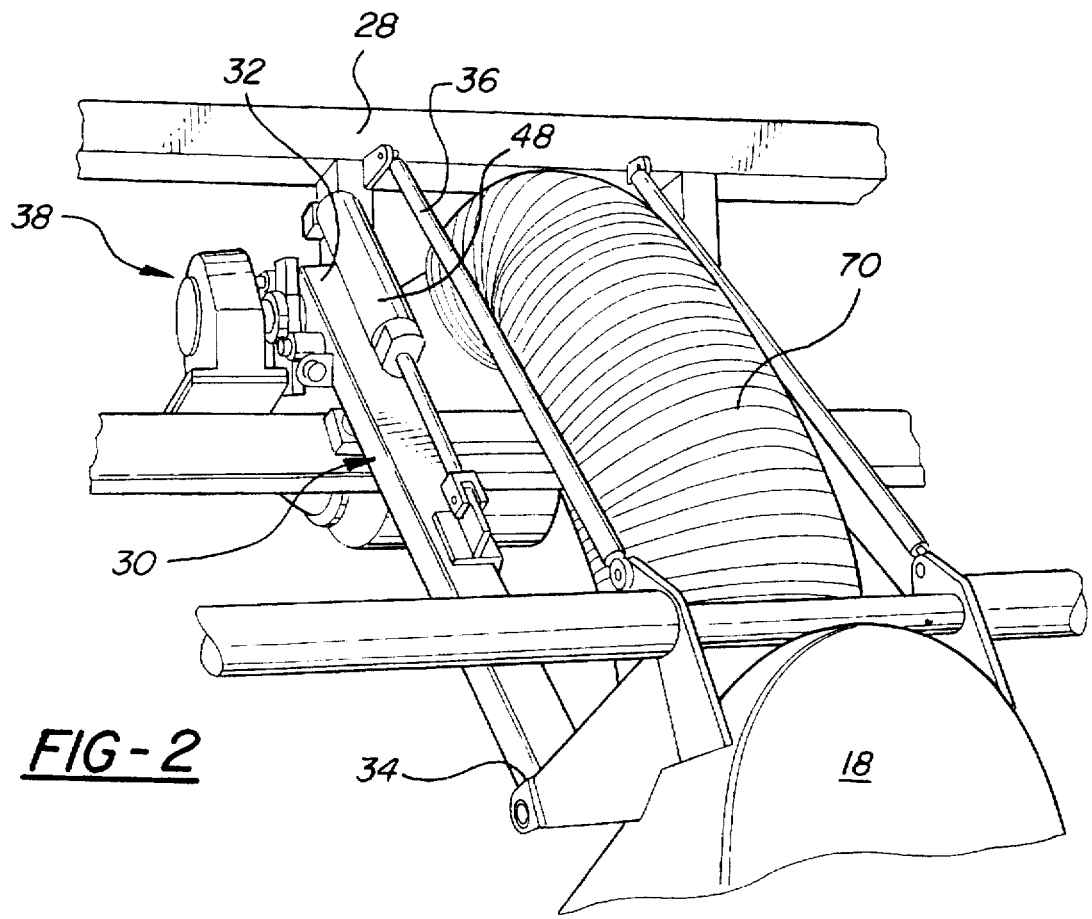
FIG. 2 is an enlarged partial perspective view of the dryer mechanism.
Figure 3:
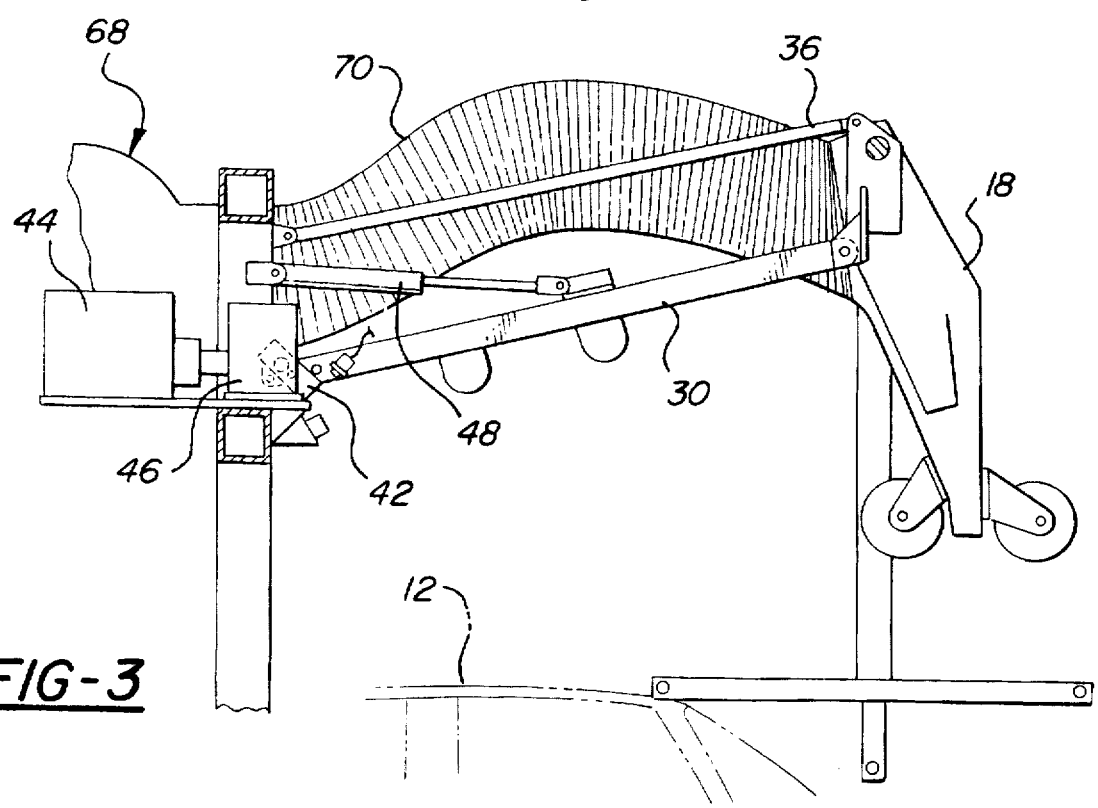
FIG. 3 is a right side elevational view of the dryer in the raised position.
Figure 4:
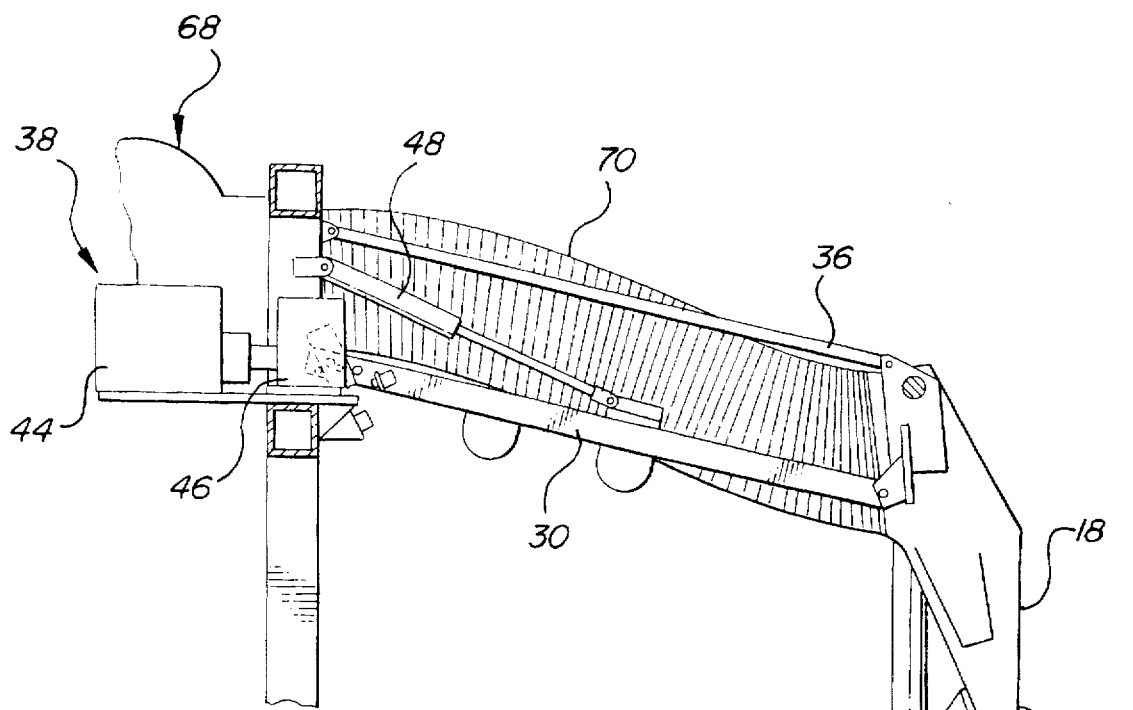
FIG. 4 is a right side elevational view of the dryer in an intermediate position.

FIG. 2 illustrates the nozzle in a lower most position; FIG. 3 illustrates the nozzle in the raised position and FIG. 4 illustrates the nozzle in an intermediate position. The nozzle is raised by a drive mechanism, generally illustrated as 38. The nozzle and arm are lowered by the force of gravity. As can be seen with reference to FIGS. 1–4, the nozzle is oriented downstream of the frame in the direction of vehicle travel. The nozzle and arm are cantileveredly suspended from the frame. As the first end 32 of arm 30 is pivotally connected to the frame, drive mechanism 38 must exert a torque on the arm to counteract the gravitational and inertia loads necessary to maintain the desired arm position.

Drive mechanism 38 is made up of three primary components, roller followers 40 and 40' which are pivotally connected to arm 30; drive member 42 which is a rectangular cam which cooperates with the followers 40 and 40', raise the arm to the desired position and reversible motor 44 which is connected to drive member 42 via the right angle gear box 46. Reversible motor 44 provides a drive means operably connected to the drive member for raising and lowering the arm and attached nozzle to the desired location. It should be appreciated that the drive means may be provided by an electric DC motor and associated gear reduction as illustrated or numerous other mechanically equivalent structures such as hydraulic and pneumatic motor, a rotary shaft having a drive lever actuated by a linear actuator or a linear actuator driving a wedge-like linear cam.

Figure 5:
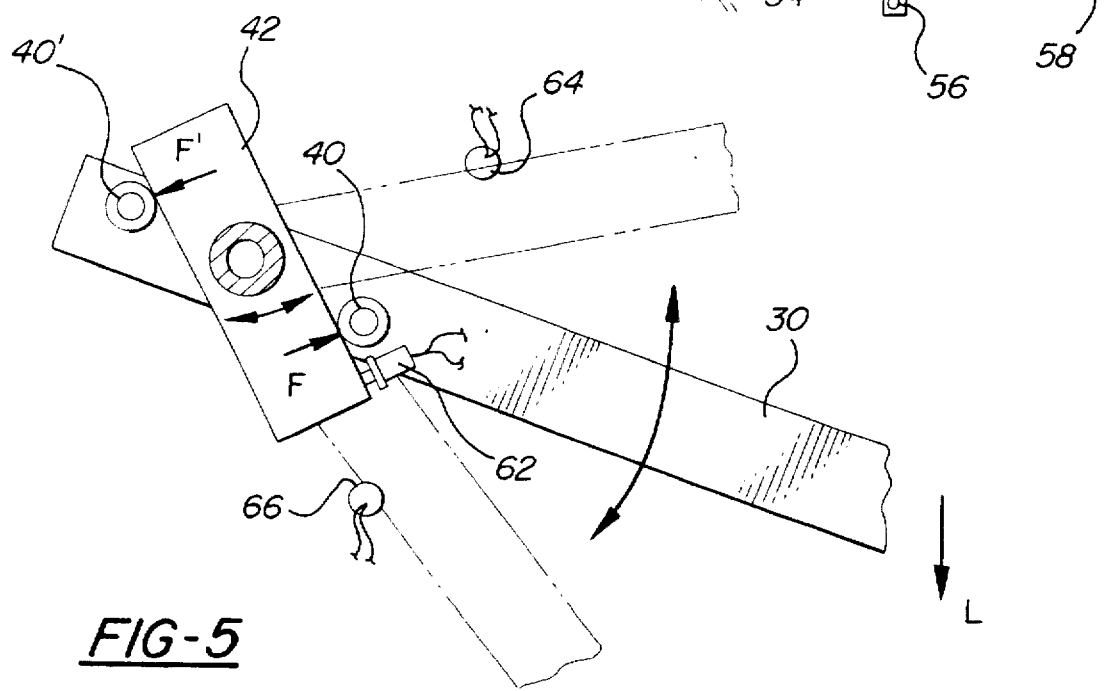
FIG. 5 is an enlarged illustration of the arm and drive mechanism in various positions.

As illustrated in FIG. 5, the axis of rotation of drive member 42 is coaxial with the pivotal attachment of arm 30 to frame 28. The drive mechanism only raises the arm, the arm is lowered by gravity. The weight of the nozzle not shown in FIG. 5, exerts a load L on the arm, causing the arm and nozzle to want to rotate clockwise about the pivotal attachments to the frame. Drive member 42 is a rectangular cam which engages followers 40 and 40' as illustrated. The reaction force caused by the engagement of roller followers 40 and 40', drive member 42 is illustrated by force vectors F and F'. As shown in FIG. 5, the resulting counterclockwise moment from vectors F and F' urge arm 30 upwardly, i.e. counterclockwise. When it is desired to raise the nozzle, drive member 42 is rotated counterclockwise. When it is desired to lower the nozzle, drive member 42 is rotated clockwise. In normal operation of followers 40 and 40' will continually maintain a contact with drive member 42.

Figure 6:
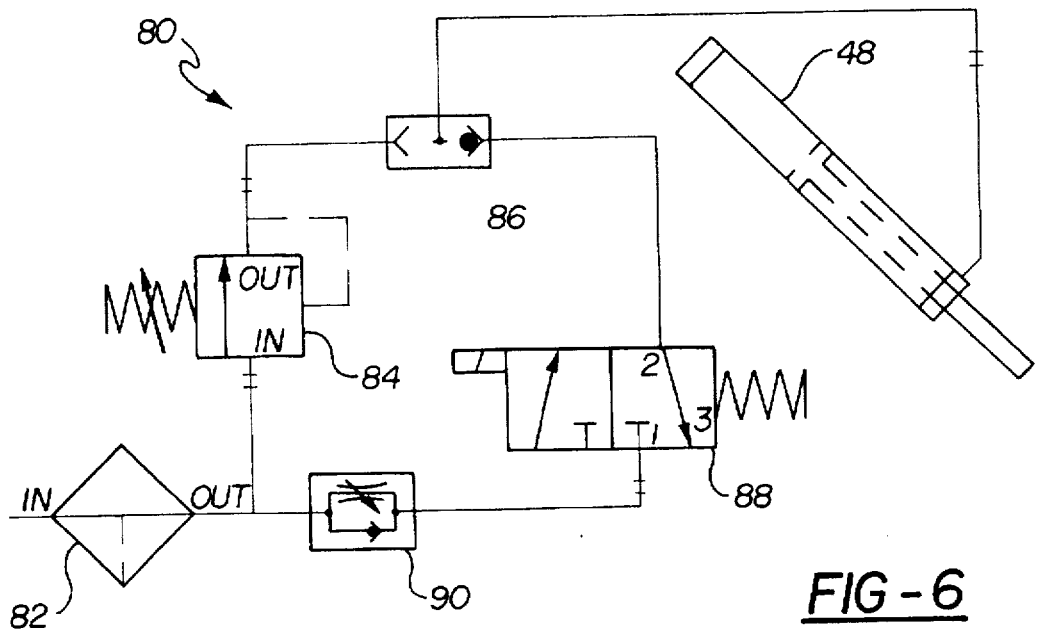
FIG. 6 is a schematic view of the dryer's pneumatic system.

In order to limit the load exerted on the drive mechanism, a pneumatic cylinder 48 is provided which is connected to frame 28 and arm 30 to urge the nozzle upwardly. The force exerted on the arm by pneumatic cylinder 48 is not sufficient to in itself raise the arm in normal operation. As illustrated in FIG. 6, one port of pneumatic cylinder 48 is connected to the source of pressurized air, the other port is vented to atmosphere. The structure of pneumatic cylinder 48 and the drive mechanism illustrated in FIG. 5 enables the nozzle and arm assembly to freely rise in response to inadvertent contact of the nozzle and the vehicle, yet very precise positional control of the nozzle can be achieved by the mechanical drive mechanism.

In operation, an optical sensor array 50 is provided for sensing the location of the vehicle relative to the nozzle. Optical sensor array is made up of a U-shaped arch 52 shown in FIG. 1 which is affixed to center nozzle 18. On the right and left side of U-shaped arch 52, are a series of optic sensors are provided forming three sensor pairs; a front optic sensor pair 54, a top optic sensor pair 56 and a rear optic sensor pair 58. Pair front, top and rear correspond to the portion of the vehicle structure which the optic sensors senses. The use of three optic sensors in such a manner is conventional technology which is well known to those who have skill in the car wash control art.

Figure 7:
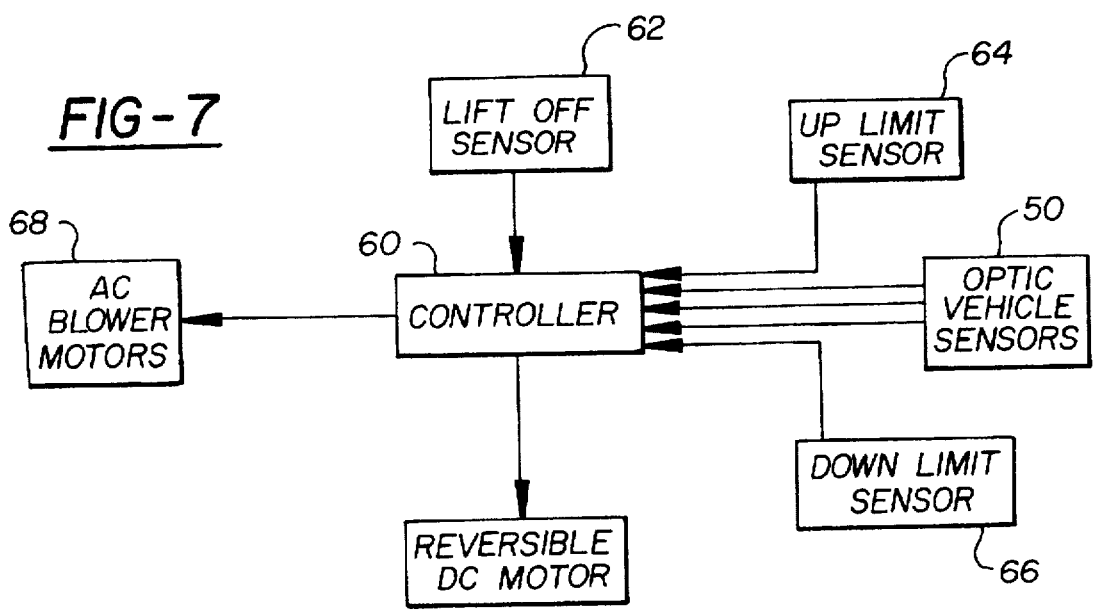
FIG. 7 is a schematic view of the dryer's electrical control system.

The outputs of the three optic sensor pairs are provided to the dryer controller 60 shown schematically in FIG. 7. In addition to the input from the optic vehicle sensors 50, a controller 60 is provided with input from lift: off sensor 62, up limit sensor 64 and down limit sensor 66 shown schematically in FIG. 5. Up and down limit sensors 64 and 66 simply detect the location of the arm and provide an input enabling the controller to limit the maximum range of arm movement. Lift off sensor 62 insures that the followers 40 and 40' maintain contact with drive member 42 as the arm and nozzle are being lowered.

If for some reason the nozzle or arm were to hang up while the controller was driving the drive member 42 clockwise to lower the arm, when the follower 40 and 40' would lift: off drive member 42 as the drive member was rotated clockwise shown in FIG. 5. If the obstruction restraining the movement of the arm or nozzle was removed, the arm and nozzle could fall freely until the followers 40 and 40' contact drive member 42. To avoid any significant fall of this type and associated vehicle damage, lift off sensor 62 provides a signal to controller 60 when follower 40 lifts off of drive member 42. Further movement of the drive member 42 in a direction causing the arm to lower would stop until the arm dropped sufficiently to cause follower 40 to recontact drive member 42. To further limit the rate of fall of arm 30 and associated nozzle, a hydraulic shock absorber not shown is provided cooperating with the arm and the frame. Ideally, the shock absorber will be of the type having a one-way check valve enabling the arm to raise freely and a variable area orifice enabling the damping to be set to the desired level. Hydraulic shock absorber of this type is illustrated in FIG. 12 of U.S. Pat. No. 5,325,559, Belanger et al., which is incorporated by reference herein for the purposes of providing disclosure of this element.

Controller 60 is provided with two outputs; one output is for the reversible DC motor 44 which drives drive member 42. The other output is an AC to a relay for blower motor 68 which supplies pressurized air to nozzle 18. The blower can thereby be turned off when no vehicle is present in the drying stage of the car wash apparatus.

A flexible conduit 70 connects blower motor 68 to nozzle 18 as illustrated in FIG. 1. The right and left side nozzles 20 and 22 are each provided with their own blower motor assembly 72 and 74. Blower mower assembly 72 and 74 are connected to right and left side nozzles 20 and 22 via flexible conduits 76 and 78 to enable the car wash operator to position the side nozzles in the desired fixed orientation. Blower motor 72 and 74 are similarly controlled by a power relay actuated by controller 60 to enable the blowers to be turned off when a vehicle is not present in the drying station.

The pneumatic circuit 80 illustrated in FIG. 6 provides a source of pressurized air to pneumatic cylinder 48. Pneumatic circuit 80 is made up of a filter 82 having an inlet connected to shop air. The output of filter 82 is connected to regulator 84 which can be varied to set the air pressure supplied to pneumatic cylinder 48. The output of regulator 84 is connected to pneumatic cylinder 48 via shuttle valve 86. Shuttle valve 86 has two inputs - one input connected to regulator 84 and the other input connected to three-way valve 88. Three-way valve as illustrated has input port number 1 deadheaded and output port 2 connected to open input port 3, thereby venting three-way valve output port 2 to atmosphere. The shuttle valve 86 connects pressure regulator 84 to pneumatic cylinder 48. When three-way valve 88 is shifted to its alternative orientation, input port number 1 and output port number 2 are connected, thereby providing a higher pressure air to pneumatic cylinder 48, thereby raising the arm and nozzle free from the vehicle. Flow control 90 is provided to regulate the flow of air supplied to pneumatic cylinder 48 when three-way valve 88 is actuated to regulate the speed at which the nozzle and arm are raised. It should be appreciated that both flow control 90 and regulator 84 are variable to enable the system operator to adjust the speed at which the arm and nozzle raises when three-way valve 88 actuated and the amount of supplemental lift force is provided pneumatic cylinder 48 when flow regulator 84 is adjusted.

While the preceding description of the best mode of carrying out the claimed invention describes in detail the preferred embodiment, the invention is not limited to the preferred embodiment and many of your variations can be made without departing from the scope of the invention. For example, but by no means all inclusive, DC motor 48 and right angle drive 46 could be replaced by a hydraulic pump and motor combination. A functional drive motor only needs to rotate the drive member to the desired location and preferably hold the drive member fixed when the drive motor is in the off state. Similarly, drive member 42 which forms a rectangular can pivotable about the pivot axis of the arm first end, and could be replaced by an elliptical cam acting on a single point on the arm remote from the pivot. It should also be understood that the words used in the description of the best mode for practicing the invention, are intended to be descriptive in nature rather than limitations and various changes may be made without departing from the sphere and the scope of the invention claimed.

What is claimed:

1. A dryer having a nozzle which automatically follows the contour of the surface of the vehicle passing horizontally thereby, said dryer comprising:

a frame positioned relative to a longitudinal path of a vehicle to be dried;

a nozzle for directing a stream of air against the vehicle surface;

an elongated arm having a first end pivotally attached to said frame and a second end attached to said nozzle and spaced longitudinally from said frame to facilitate limited up and down movement of the nozzle; and a drive mechanism for raising the arm and associated nozzle to enable the nozzle to follow the contour of the vehicle, said drive mechanism including a follower affixed to said arm, a drive member cooperating with the follower, and a drive means operably connected to the drive member to enable the arm and nozzle to be raised to the desired location;

wherein said nozzle and arm are lowered by the force of gravity which urges said follower into engagement with said drive member, said follower being capable of being freely lifted off of the drive member to enable the nozzle to rise up in the event of contact with the vehicle thereby minimizing any damage thereto.

2. The dryer of claim 1 wherein said drive means further comprises a reversible drive which when in the off position, has sufficient resistance to rotation to maintain the position of the arm and nozzle.

3. The dryer of claim 2 wherein said drive member further comprises a rotary cam.

4. The dryer of claim 1 further comprising a blower providing a source of air and a conduit interconnecting the blower to said nozzle, wherein said blower is affixed to said frame.

5. The dryer of claim 1 further comprising an elongated link spaced vertically from the arm and having a first end pivotally affixed to the frame and a second end pivotally affixed to the nozzle so that a four bar linkage is formed by the frame, arm, nozzle and link thereby controlling the orientation of the nozzle as a vertical height and nozzle is varied.

6. The dryer of claim 1 further comprising a pneumatic cylinder cooperating with the frame and the arm to urge the arm and nozzle upward, counter balancing, but not exceeding the gravity load thereon, in order to minimize the load exerted on the drive mechanism when in normal operation.

7. The dryer of claim 1 further comprising an optical vehicle position sensor affixed relative to the nozzle and oriented out of the path of the vehicle, optically detecting the position of the vehicle without contact therewith, and a control circuit cooperating with a sensor and the drive means to automatically raise and lower the nozzle to follow the contour of the vehicle.

8. The dryer of claim 1 further comprising a sensor for monitoring the separation of the drive mechanism follower from the drive member.

9. The dryer of claim 1 wherein said arm extends generally downstream from the frame in the direction of vehicle movement.

10. The dryer of claim 1 wherein the drive means comprises a reversible motor having a rotary output.

11. The dryer of claim 1 wherein said frame comprises a generally U-shaped arch extending over the path of the vehicle having a horizontal upper member supporting said arm and a right/left generally vertical frame members spaced apart on opposite sides of the longitudinal path of the vehicle.

12. The dryer of claim 11 further comprising a right and left side nozzle affixed to the right and left vertical frame members respectively, each coupled to a source of air, said nozzles directing air inwardly toward the longitudinal path of the vehicle to dry the side surfaces thereof.

13. An apparatus for blowing a stream of air on the upper surfaces of a vehicle passing horizontally thereby along a longitudinal path, said apparatus comprising:

a frame positionable relative to said longitudinal path of the vehicle;

a nozzle for directing a stream of air against the vehicle's upper surfaces;

an arm having a first end pivotally attached to said frame and a second end attached to said nozzle to position the nozzle longitudinally away from said frame to facilitate limited up and down movement of the nozzle;

a drive mechanism for raising the arm and associated nozzle to enable the nozzle to follow the contour of the vehicle, said drive mechanism including a follower affixed to the arm, a drive member cooperable with the follower, and a drive means operably connected to the drive member to enable the arm and nozzle to be raised to the desired height; and a pneumatic cylinder cooperating with the frame and the arm to urge the arm and nozzle upward, counter balancing, but not exceeding the gravity load thereon, in order to minimize the load exerted on the drive mechanism when in normal operation;

wherein said nozzle and arm are lowered by the force of gravity which urges the follower into contact with the drive member, said follower being capable of being freely lifted off of the drive member to enable the nozzle and arm to freely rise up in the event of inadvertent contact with the vehicle, thereby minimizing accidental damage thereto.

14. The apparatus of claim 13 wherein said arm extends generally downstream from the frame in the direction of vehicle movement.

15. The apparatus of claim 13 further comprising an elongated link spaced vertically from the arm and having a first end pivotally affixed to the frame and a second end pivotally affixed to the nozzle so that a four bar linkage is formed by the frame, arm, nozzle and link thereby controlling the orientation of the nozzle as a vertical height and nozzle is varied.

16. The apparatus of claim 13 wherein said drive member further comprises a rotary cam.

17. The apparatus of claim 13 further comprising a blower providing a source of air and a conduit interconnecting the blower to said nozzle, wherein said blower is affixed to said frame.

18. The apparatus of claim 13 further comprising an elongated link spaced vertically from the arm and having a first end pivotally affixed to the frame and a second end pivotally affixed to the nozzle so that a four bar linkage is formed by the frame, arm, nozzle and link thereby controlling the orientation of the nozzle as a vertical height and nozzle is varied.

19. The apparatus of claim 13 further comprising a sensor for monitoring the separation of the drive mechanism follower from the drive member.

20. An apparatus for blowing a stream of air on the upper surfaces of a vehicle passing horizontally thereby along a longitudinal path, said apparatus comprising:

a frame positionable relative to said longitudinal path of the vehicle;

a nozzle for directing a stream of air against the vehicle's upper surfaces;

an arm having a first end pivotally attached to said frame and a second end attached to said nozzle to position the nozzle longitudinally away from said frame to facilitate limited up and down movement of the nozzle;

a drive mechanism for raising the arm and associated nozzle to enable the nozzle to follow the contour of the vehicle, said drive mechanism including a follower affixed to the arm, a drive member cooperable with the follower, and a reversible motor having a rotary output operably connected to the drive member to enable the arm and nozzle to be raised to the desired height; and a pneumatic cylinder cooperating with the frame and the arm to urge the arm and nozzle upward, counter balancing, but not exceeding the gravity load thereon, in order to minimize the load exerted on the drive mechanism when in normal operation;

wherein said nozzle and arm are lowered by the force of gravity which urges the follower into contact with the drive member, said follower being capable of being freely lifted off of the drive member to enable the nozzle and arm to freely rise up in the event of inadvertent contact with the vehicle, thereby minimizing accidental damage thereto.

* * * * *